United States Patent
Sugita et al.

(10) Patent No.: US 8,802,312 B2
(45) Date of Patent: Aug. 12, 2014

(54) FUEL CELL SEPARATORS CAPABLE OF SUPPRESSING VARIATION IN PRESSURE LOSS

(75) Inventors: Narutoshi Sugita, Utsunomiya (JP); Masaru Oda, Utsunomiya (JP); Masaaki Sakano, Utsunomiya (JP); Norimasa Kawagoe, Utsunomiya (JP); Takashi Kosaka, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 997 days.

(21) Appl. No.: 12/188,900

(22) Filed: Aug. 8, 2008

(65) Prior Publication Data
US 2009/0042088 A1    Feb. 12, 2009

(30) Foreign Application Priority Data

Aug. 10, 2007    (JP) .................................. 2007-209953

(51) Int. Cl.
*H01M 2/38*    (2006.01)
*H01M 2/40*    (2006.01)
*H01M 8/24*    (2006.01)
*H01M 8/04*    (2006.01)

(52) U.S. Cl.
USPC ........... 429/457; 429/452; 429/456; 429/458; 429/512; 429/513; 429/514

(58) Field of Classification Search
None
See application file for complete search history.

(56) References Cited

U.S. PATENT DOCUMENTS

| | | | |
|---|---|---|---|
| 6,365,295 | B1 | 4/2002 | Matsukawa et al. |
| 7,413,821 | B2 | 8/2008 | Sugiura et al. |
| 7,695,845 | B2 * | 4/2010 | Sugita et al. ................ 429/434 |
| 8,268,503 | B2 * | 9/2012 | Ishida et al. ................ 429/457 |
| 2004/0038102 | A1 | 2/2004 | Beckmann et al. |
| 2006/0204807 | A1 | 9/2006 | Kosaka et al. |
| 2007/0003816 | A1 | 1/2007 | Sugita et al. |
| 2007/0207372 | A1 * | 9/2007 | Kikuchi et al. ............ 429/38 |
| 2007/0254203 | A1 * | 11/2007 | Ishida et al. ............... 429/38 |

FOREIGN PATENT DOCUMENTS

| | | |
|---|---|---|
| EP | 0978891 A2 | 2/2000 |
| EP | 0978891 A3 | 2/2000 |
| EP | 1239530 A2 | 9/2002 |
| EP | 1239530 A3 | 9/2002 |
| JP | 2000-223137 A1 | 8/2000 |
| JP | 2002-260710 | 9/2002 |
| JP | 2005-216869 | 8/2005 |
| JP | 2007-5076 A2 | 1/2007 |
| WO | WO 2007/129642 A1 * | 11/2007 ............ H01M 8/02 |

OTHER PUBLICATIONS

European Office Action for Application No. 08014149.2, dated Dec. 8, 2008.
Japanese Office Action for Application No. 2007-209953, 6 pages, dated Aug. 28, 2012.

* cited by examiner

*Primary Examiner* — Michael Jung
(74) *Attorney, Agent, or Firm* — Nelson Mullins Riley & Scarborough LLP; Anthony A. Laurentano

(57) ABSTRACT

A fuel cell according to the present invention includes a power generation unit. The power generation unit is formed by stacking a first metal separator, a first membrane electrode assembly, a second metal separator, a second membrane electrode assembly, and a third metal separator. The number of flow grooves in a first oxygen-containing gas flow field is different from the number of flow grooves in a second oxygen-containing gas flow field. The first oxygen-containing gas flow field and the second oxygen-containing gas flow field have the same length, and the flow grooves in the first oxygen-containing gas flow field and the flow grooves in the second oxygen-containing gas flow field have the same depth.

4 Claims, 11 Drawing Sheets

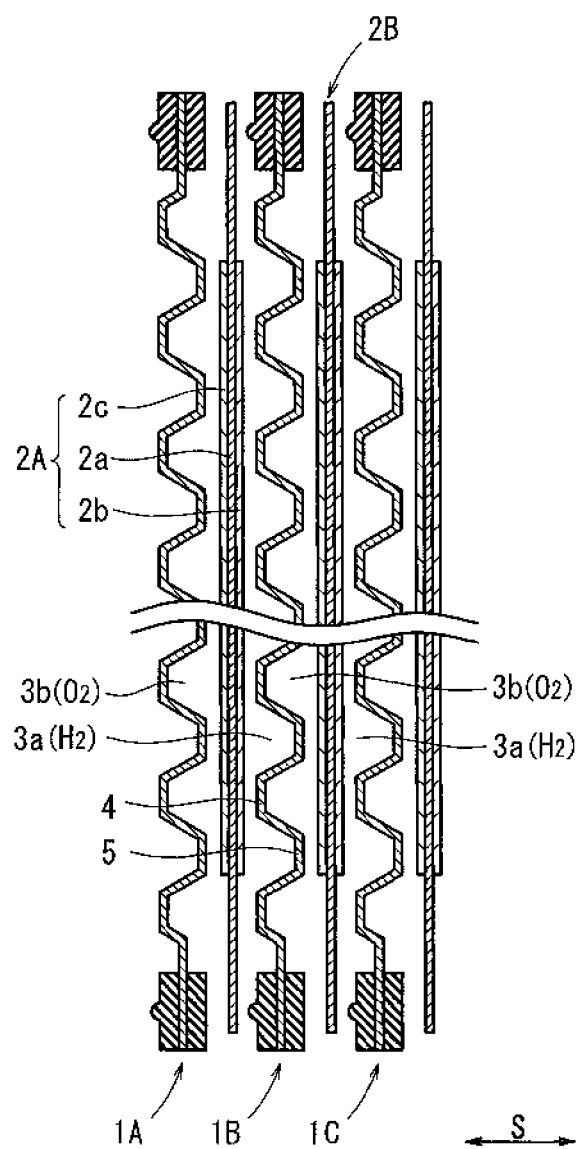

FUEL CELL SEPARATORS CAPABLE OF SUPPRESSING VARIATION IN PRESSURE LOSS

BACKGROUND OF THE INVENTION

1. Field of the Invention

The present invention relates to a fuel cell having a power generation unit including a first metal separator, a first electrolyte electrode assembly stacked on the first metal separator, a second metal separator stacked on the first electrolyte electrode assembly, a second electrolyte electrode assembly stacked on the second metal separator, and a third metal separator stacked on the second electrolyte electrode assembly.

2. Description of the Related Art

For example, a solid polymer electrolyte fuel cell employs a solid polymer electrolyte membrane. The solid polymer electrolyte membrane is a polymer ion exchange membrane, and interposed between an anode and a cathode to form a membrane electrode assembly (electrolyte electrode assembly). Each of the anode and the cathode includes an electrode catalyst layer and porous carbon. The membrane electrode assembly is sandwiched between a pair of separators (bipolar plates). The membrane electrode assembly and the separators make up a unit cell for generating electricity. In use, typically, a predetermined number of unit cells are stacked together to form a fuel cell stack.

In the fuel cell, a fuel gas flow field (reactant gas flow field) for supplying a fuel gas is formed on a separator surface facing the anode, and an oxygen-containing gas flow field (reactant gas flow field) for supplying an oxygen-containing gas is formed on a separator surface facing the cathode. Further, as necessary, a coolant flow field for supplying a coolant along separator surfaces is formed between separators.

In some designs, the coolant flow field is provided for every predetermined number of unit cells for so-called skip cooling to reduce the number of the coolant flow fields, and reduce the overall size of the fuel cell stack in the stacking direction.

For example, a fuel cell disclosed in Japanese Laid-Open Patent Publication No. 2000-223137 shown in FIG. 11 includes a separator 1A, an electrode unit 2A stacked on the separator 1A, a separator 1B stacked on the electrode unit 2A, an electrode unit 2B stacked on the first separator 1B, and a separator 1C stacked on the electrode unit 2B. Each of the electrode units 2A, 2B includes a fuel electrode 2b, an air electrode 2c, and a solid electrolyte membrane 2a interposed between the fuel electrode 2b and the air electrode 2c.

Each of the separators 1A to 1C has a fuel gas flow field 3a on a surface facing the fuel electrode 2b, and has an oxygen-containing gas flow field 3b on a surface facing the air electrode 2c.

Each of the separators 1A to 1C has ridges 4 protruding in one direction formed by corrugating a metal plate. The ridges 4 contact the fuel electrode 2b to form the fuel gas flow field 3a. Further, each of the separators 1A to 1C has ridges 5 protruding in the other direction. The ridges 5 contact the air electrodes 2c to form the oxygen-containing gas flow field 3b.

However, in the fuel cell, when the electrode unit 2A is sandwiched between the separator 1A and the separator 1B, the ridges 4 and the ridges 5 are offset from each other in the stacking direction indicated by an arrow S. In the structure, the electrode unit 2A cannot be sandwiched securely between the separators 1A and 1B. Thus, it is difficult to apply the desired tightening load to the electrode unit 2A. Consequently, power generation cannot be performed efficiently, and the electrode units 2A, 2B may be damaged undesirably.

SUMMARY OF THE INVENTION

The present invention has been made to solve the above problem, and an object of the present invention is to provide a fuel cell in which reactant gas flow fields for the same reactant gas have different numbers of flow grooves, while maintaining the same power generation characteristics with simple structure.

The present invention relates to a fuel cell stack formed by stacking a plurality of power generation units. Each of the power generation units includes at least first and second electrolyte electrode assemblies, and formed by stacking the first electrolyte electrode assembly on a first metal separator, a second metal separator on the first electrolyte electrode assembly, the second electrolyte electrode assembly on the second metal separator, and a third metal separator on the second electrolyte electrode assembly. Each of the first and second electrolyte electrode assembly includes a pair of electrodes, and an electrolyte interposed between the electrodes. First to fourth reactant gas flow fields for allowing predetermined reactant gases to flow along power generation surfaces are formed between the first metal separator and the first electrolyte electrode assembly, between the first electrolyte electrode assembly and the second metal separator, between the second metal separator and the second electrolyte electrode assembly, and between the second electrolyte electrode assembly and the third metal separator. A coolant flow field for allowing a coolant to flow is formed in each space between the power generation units.

The same reactant gas flows through the first and third reactant gas flow fields, and the number of flow grooves in the first reactant gas flow field is different from the number of flow grooves in the third reactant gas flow field, the first reactant gas flow field and the third reactant gas flow field have the same length, and the flow grooves in the first reactant gas flow field and the flow grooves in the third reactant gas flow field have the same depth.

In the present invention, the first and third reactant gas flow fields for allowing a first reactant gas to flow have the same length, and the flow grooves in the first reactant gas flow field and the flow grooves in the third reactant gas flow field have the same depth. In the structure, even if the number of flow grooves in the first reactant gas flow field is different from the number of flow grooves in the third reactant gas flow field, variation in the pressure loss is suppressed effectively. With simple structure, it is possible to maintain the same power generation characteristics.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 11 is a cross sectional view showing a conventional fuel cell.

DESCRIPTION OF THE PREFERRED EMBODIMENTS

Figure 1:
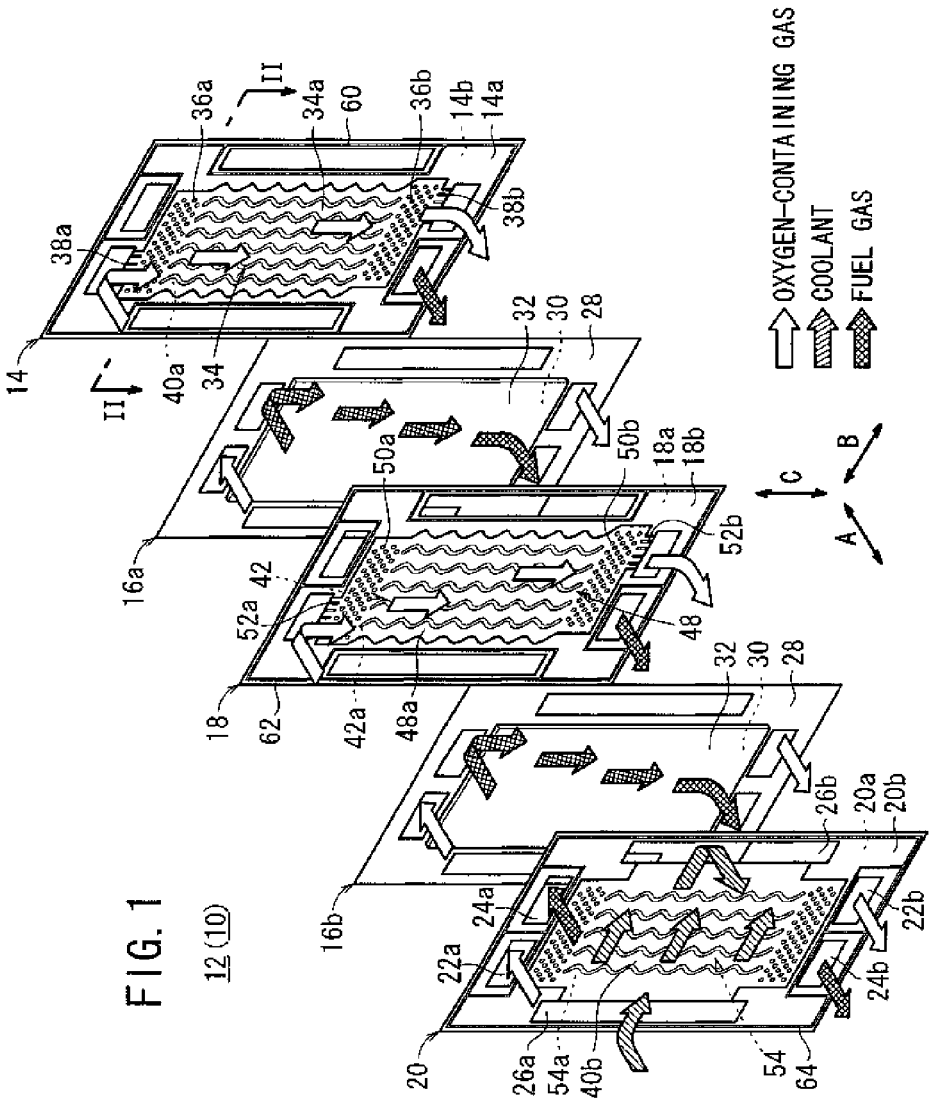
FIG. 1 is an exploded perspective view showing a fuel cell according to a first embodiment of the present invention.
Figure 2:
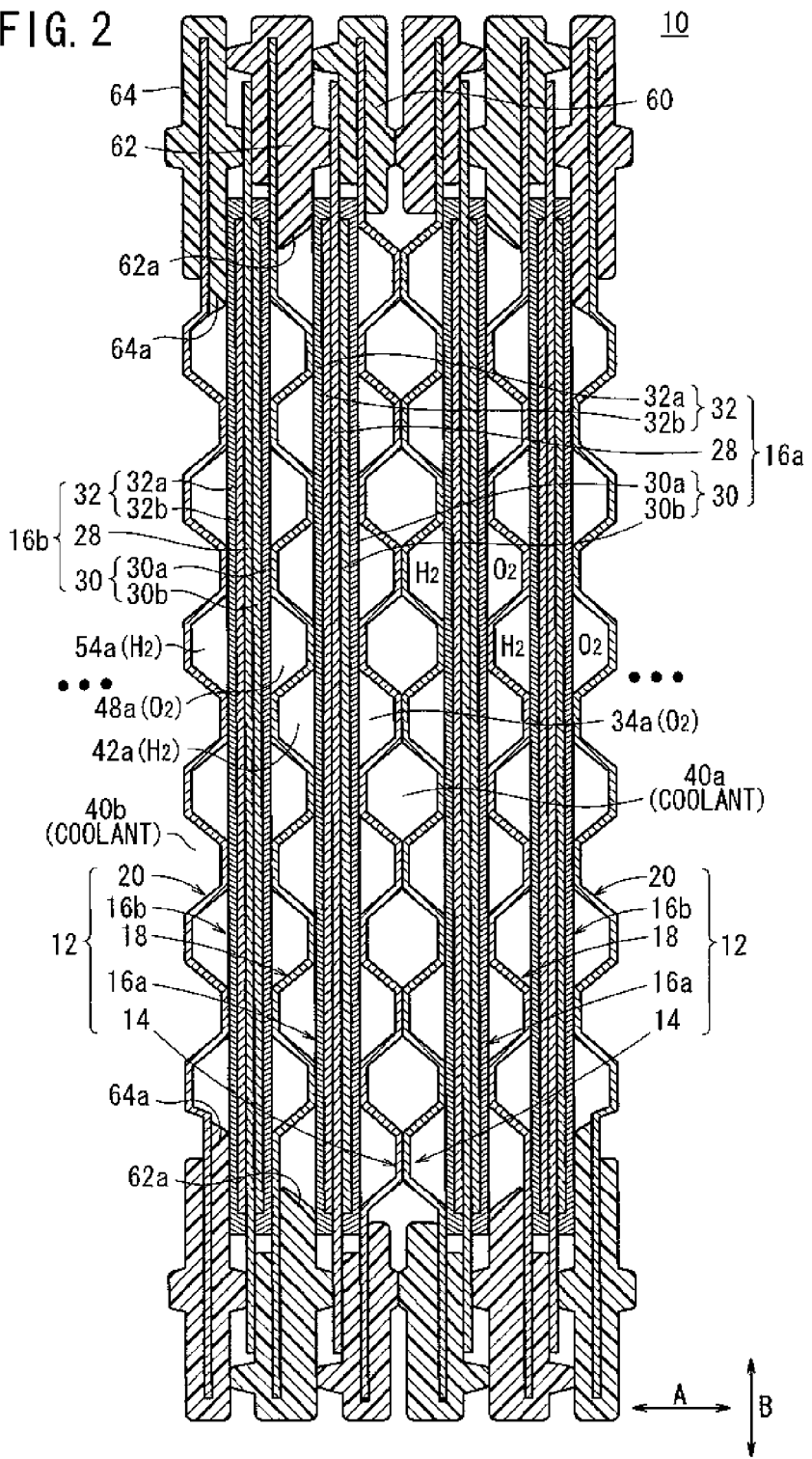
FIG. 2 is a cross sectional view showing the fuel cell, taken along a line II-II in FIG. 1.

A fuel cell 10 is formed by reversing a plurality of power generation units 12 with respect to one another, and stacking the power generation units 12 in a horizontal direction indicated by an arrow A (see FIGS. 1 and 2). The power generation unit 12 includes a first metal separator 14, a first membrane electrode assembly (MEA) 16*a* stacked on the first metal separator 14, a second metal separator 18 stacked on the first membrane electrode assembly (MEA) 16*a*, a second membrane electrode assembly (MEA) 16*b* stacked on the second metal separator 18, and a third metal separator 20 stacked on the second membrane electrode assembly (MEA) 16*b*.

As shown in FIG. 1, at an upper end of the power generation unit 12 in a longitudinal direction, an oxygen-containing gas supply passage 22*a* for supplying an oxygen-containing gas and a fuel gas supply passage 24*a* for supplying a fuel gas such as a hydrogen-containing gas are provided. The oxygen-containing gas supply passage 22*a* and the fuel gas supply passage 24*a* extend through the power generation unit 12 in the direction indicated by the arrow A.

At a lower end of the power generation unit 12 in the longitudinal direction, a fuel gas discharge passage 24*b* for discharging the fuel gas and an oxygen-containing gas discharge passage 22*b* for discharging the oxygen-containing gas are provided. The fuel gas discharge passage 24*b* and the oxygen-containing gas discharge passage 22*b* extend through the power generation unit 12 in the direction indicated by the arrow A.

At one end of the power generation unit 12 in a lateral direction indicated by an arrow B, a coolant supply passage 26*a* for supplying a coolant is provided, and at the other end of the power generation unit 12 in the lateral direction, a coolant discharge passage 26*b* for discharging the coolant is provided. The coolant supply passage 26*a* and the coolant discharge passage 26*b* extend through the power generation unit 12 in the direction indicated by the arrow A.

Each of the first and second membrane electrode assemblies 16*a*, 16*b* includes a cathode 30, an anode 32, and a solid polymer electrolyte membrane 28 interposed between the cathode 30 and the anode 32. The solid polymer electrolyte membrane 28 is formed by impregnating a thin membrane of perfluorosulfonic acid with water, for example.

As shown in FIG. 2, each of the cathode 30 and the anode 32 has a gas diffusion layer 30*a*, 32*a* such as a carbon paper, and an electrode catalyst layer 30*b*, 32*b* of platinum alloy supported on porous carbon particles. The carbon particles are deposited uniformly on the surface of the gas diffusion layer 30*a*, 32*a*. The electrode catalyst layer 30*b* of the cathode 30 and the electrode catalyst layer 32*b* of the anode 32 are fixed to both surfaces of the solid polymer electrolyte membrane 28, respectively.

As shown in FIG. 1, the first metal separator 14 has a first oxygen-containing gas flow field (first reactant gas flow field) 34 on a surface 14*a* facing the first membrane electrode assembly 16*a*. The first oxygen-containing gas flow field 34 is connected to the oxygen-containing gas supply passage 22*a* and the oxygen-containing gas discharge passage 22*b*. The first oxygen-containing gas flow field 34 includes a plurality of corrugated flow grooves 34*a* only extending in the longitudinal direction indicated by the arrow C. An inlet buffer 36*a* and an outlet buffer 36*b* are provided at upper and lower ends of the corrugated flow grooves 34*a* in the direction indicated by the arrow C.

Each of the inlet buffer 36*a* and the outlet buffer 36*b* has a rectangular shape, and includes a plurality of bosses. A plurality of receivers 38*a* forming a connection channel are provided between the oxygen-containing gas supply passage 22*a* and the inlet buffer 36*a*, and a plurality of receivers 38*b* forming a connection channel are provided between the oxygen-containing gas discharge passage 22*b* and the outlet buffer 36*b*.

A first coolant flow field 40*a* is formed on a surface 14*b* of the first metal separator 14. The first coolant flow field 40*a* is formed on the back surface of the first oxygen-containing gas flow field 34 and corresponds to the back surface shape of the first oxygen-containing gas flow field 34. The first coolant flow field 40*a* connects the coolant supply passage 26*a* and the coolant discharge passage 26*b*.

Figure 3:
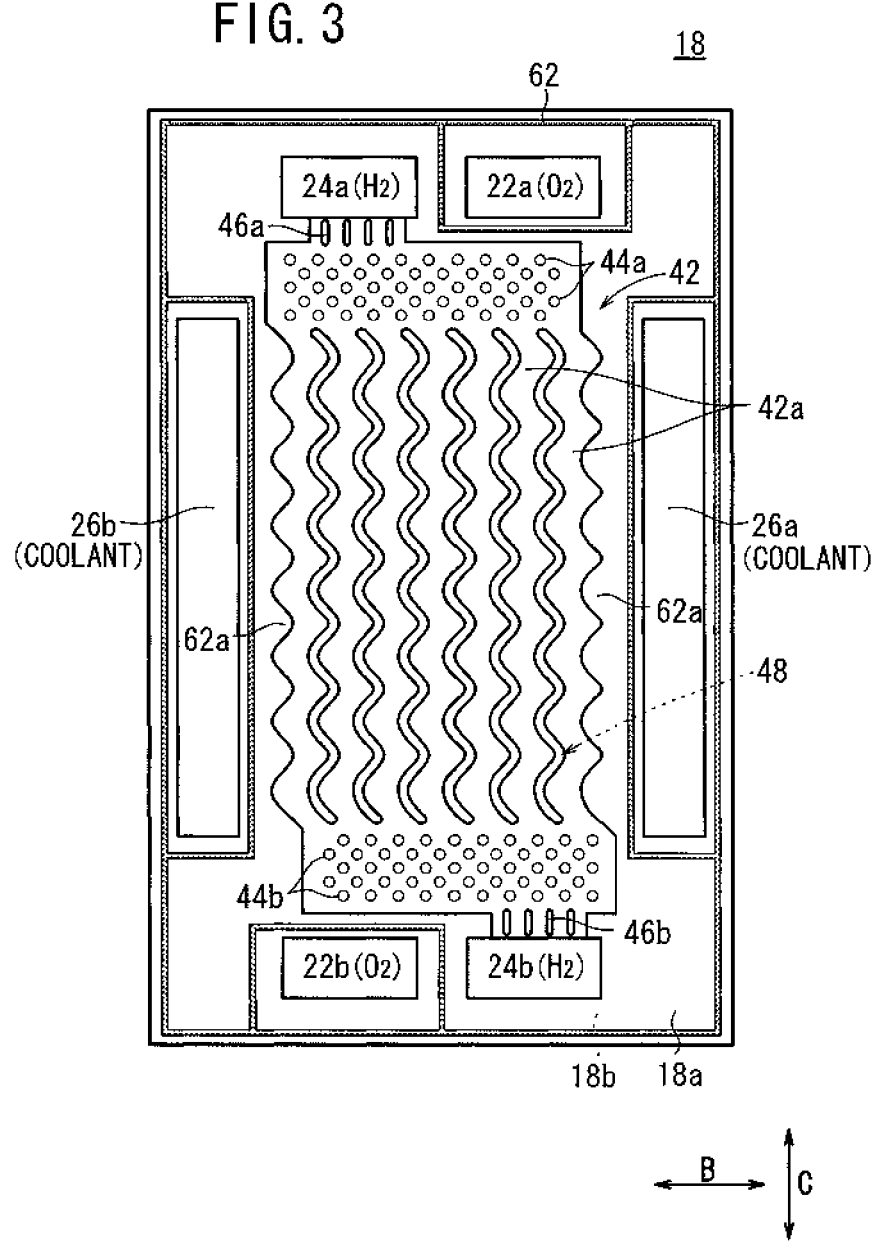
FIG. 3 is a front view showing a second metal separator of the fuel cell.

As shown in FIG. 3, the second metal separator 18 has a first fuel gas flow field (second reactant gas flow field) 42 on a surface 18*a* of the second metal separator 18 facing the first membrane electrode assembly 16*a*. The first fuel gas flow field 42 is connected to the fuel gas supply passage 24*a* and the fuel gas discharge passage 24*b*. The first fuel gas flow field 42 includes a plurality of corrugated flow grooves 42*a* only extending in the longitudinal direction indicated by the arrow C. An inlet buffer 44*a* and an outlet buffer 44*b* are provided at upper and lower ends of the corrugated flow grooves 42*a* in the direction indicated by the arrow C.

Each of the inlet buffer 44*a* and the outlet buffer 44*b* has a rectangular shape, and includes a plurality of bosses. A plurality of receivers 46*a* forming a connection channel are provided between the fuel gas supply passage 24*a* and the inlet buffer 44*a*, and a plurality of receivers 46*b* forming a connection channel are provided between the fuel gas discharge passage 24*b* and the outlet buffer 44*b*.

As shown in FIG. 1, the second metal separator 18 has a second oxygen-containing gas flow field (third reactant gas flow field) 48 on a surface 18*b* of the second metal separator 18 facing the second membrane electrode assembly 16*b*. The second oxygen-containing gas flow field 48 is connected to the oxygen-containing gas supply passage 22*a* and the oxygen-containing gas discharge passage 22*b*. The second oxygen-containing gas flow field 48 includes a plurality of corrugated flow grooves 48*a* only extending in the longitudinal direction indicated by the arrow C. An inlet buffer 50*a* and an outlet buffer 50*b* are provided at upper and lower ends of the corrugated flow grooves 48*a* in the direction indicated by the arrow C.

Each of the inlet buffer 50*a* and the outlet buffer 50*b* has a rectangular shape, and includes a plurality of bosses. A plurality of receivers 52*a* forming a connection channel are provided between the oxygen-containing gas supply passage 22*a* and the inlet buffer 50*a*, and a plurality of receivers 52*b* forming a connection channel are provided between the oxygen-containing gas discharge passage 22b and the outlet buffer 50b.

Figure 4:
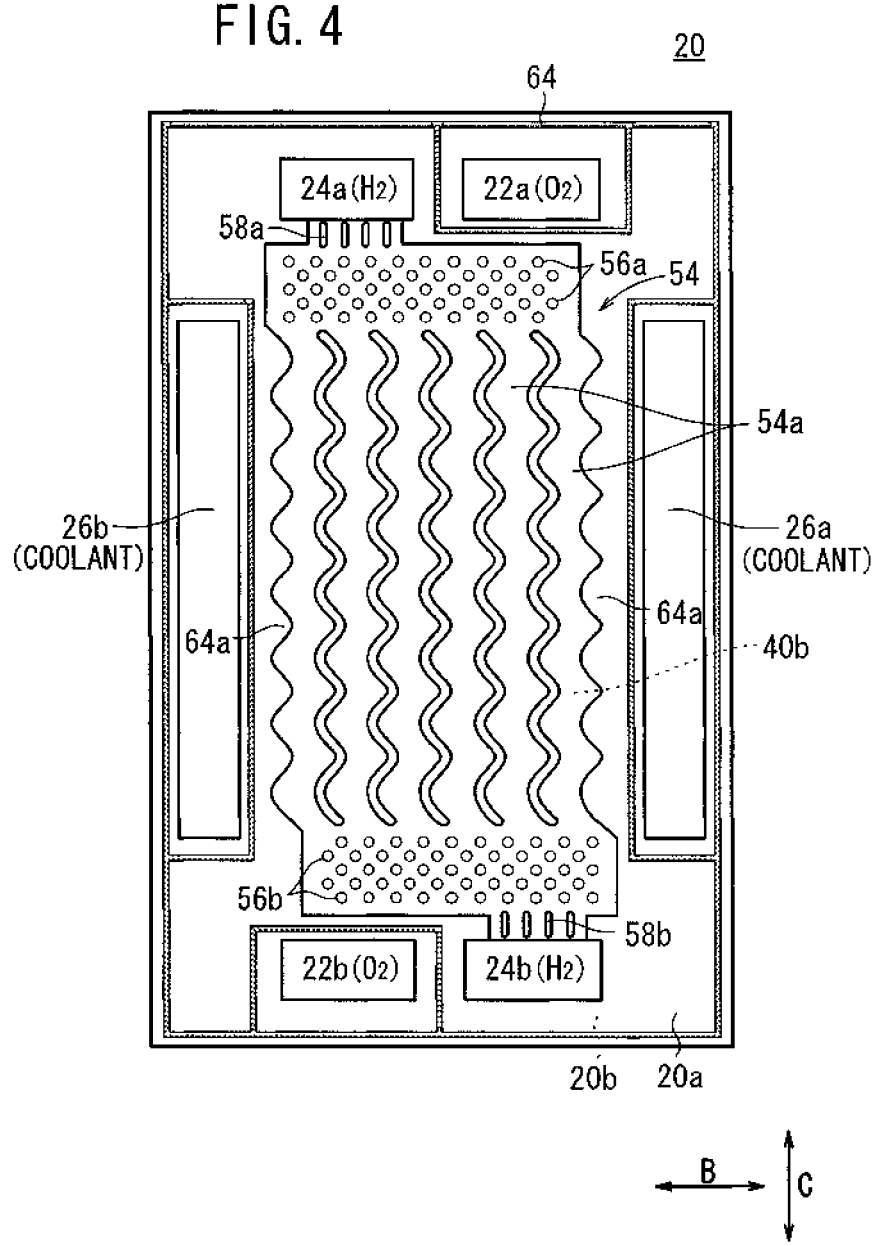
FIG. 4 is a front view showing a third metal separator of the fuel cell.

As shown in FIG. 4, the third metal separator 20 has a second fuel gas flow field (fourth reactant gas flow field) 54 on a surface 20a of the third metal separator 20 facing the second membrane electrode assembly 16b. The second fuel gas flow field 54 is connected to the fuel gas supply passage 24a and the fuel gas discharge passage 24b. The second fuel gas flow field 54 includes a plurality of corrugated flow grooves 54a only extending in the longitudinal direction indicated by the arrow C. An inlet buffer 56a and an outlet buffer 56b are provided at upper and lower ends of the corrugated flow grooves 54a in the direction indicated by the arrow C.

Each of the inlet buffer 56a and the outlet buffer 56b has a rectangular shape, and includes a plurality of bosses. A plurality of receivers 58a forming a connection channel are provided between the fuel gas supply passage 24a and the inlet buffer 56a, and a plurality of receivers 58b forming a connection channel are provided between the fuel gas discharge passage 24b and the outlet buffer 56b.

A second coolant flow field 40b is formed on a surface 20b of the third metal separator 20. The second coolant flow field 40b is connected to the coolant supply passage 26a and the coolant discharge passage 26b (see FIG. 1).

A first seal member 60 is formed integrally on the surfaces 14a, 14b of the first metal separator 14. The first seal member 60 allows the oxygen-containing gas supply passage 22a and the oxygen-containing gas discharge passage 22b to be connected to the first oxygen-containing gas flow field 34 on the surface 14a of the first metal separator 14. Further, the first seal member 60 allows the coolant supply passage 26a and the coolant discharge passage 26b to be connected to the first coolant flow field 40a on the surface 14b of the first metal separator 14.

A second seal member 62 is formed integrally on the surfaces 18a, 18b of the second metal separator 18. As shown in FIG. 3, the second seal member 62 allows the fuel gas supply passage 24a and the fuel gas discharge passage 24b to be connected to the first fuel gas flow field 42 on the surface 18a of the second metal separator 18. Further, the second seal member 62 allows the oxygen-containing gas supply passage 22a and the oxygen-containing gas discharge passage 22b to be connected to the second oxygen-containing gas flow field 48 on the surface 18b of the second metal separator 18 (see FIG. 1).

A third seal member 64 is formed integrally on the surfaces 20a, 20b of the third metal separator 20. As shown in FIG. 4, the third seal member 64 allows the fuel gas supply passage 24a and the fuel gas discharge passage 24b to be connected to the second fuel gas flow field 54 on the surface 20a of the third metal separator 20. Further, the third seal member 64 allows the coolant supply passage 26a and the coolant discharge passage 26b to be connected to the second coolant flow field 40b on the surface 20b of the third metal separator 20.

The number of flow grooves in the first oxygen-containing gas flow field 34 is different from the number of flow grooves in the second oxygen-containing gas flow field 48. The number of flow grooves in the first fuel gas flow field 42 is different from the number of flow grooves in the second fuel gas flow field 54.

As schematically shown in FIGS. 1 and 2, for example, seven corrugated flow grooves 34a of the first oxygen-containing gas flow field 34 are formed on the surface 14a of the first metal separator 14. In contrast, for example, six corrugated flow grooves 48a of the second oxygen-containing gas flow field 48 are formed on the surface 18b of the second metal separator 18.

As shown in FIGS. 2 and 3, seven corrugated flow grooves 42a of the first fuel gas flow field 42 are formed on the surface 18a of the second metal separator 18. In contrast, as shown in FIGS. 2 and 4, six corrugated flow grooves 54a of the second fuel gas flow field 54 are formed on the surface 20a of the third metal separator 20.

The corrugated flow grooves 42a at opposite ends of the first fuel gas flow field 42 in the direction indicated by the arrow B are formed by channel forming portions 62a of the second seal member 62 (see FIGS. 2 and 3). Likewise, the corrugated flow groves 54a at opposite ends of the second fuel gas flow field 54 in the direction indicated by the arrow B are formed by channel forming portions 64a of the third seal member 64 (see FIGS. 2 and 4).

Figure 5:
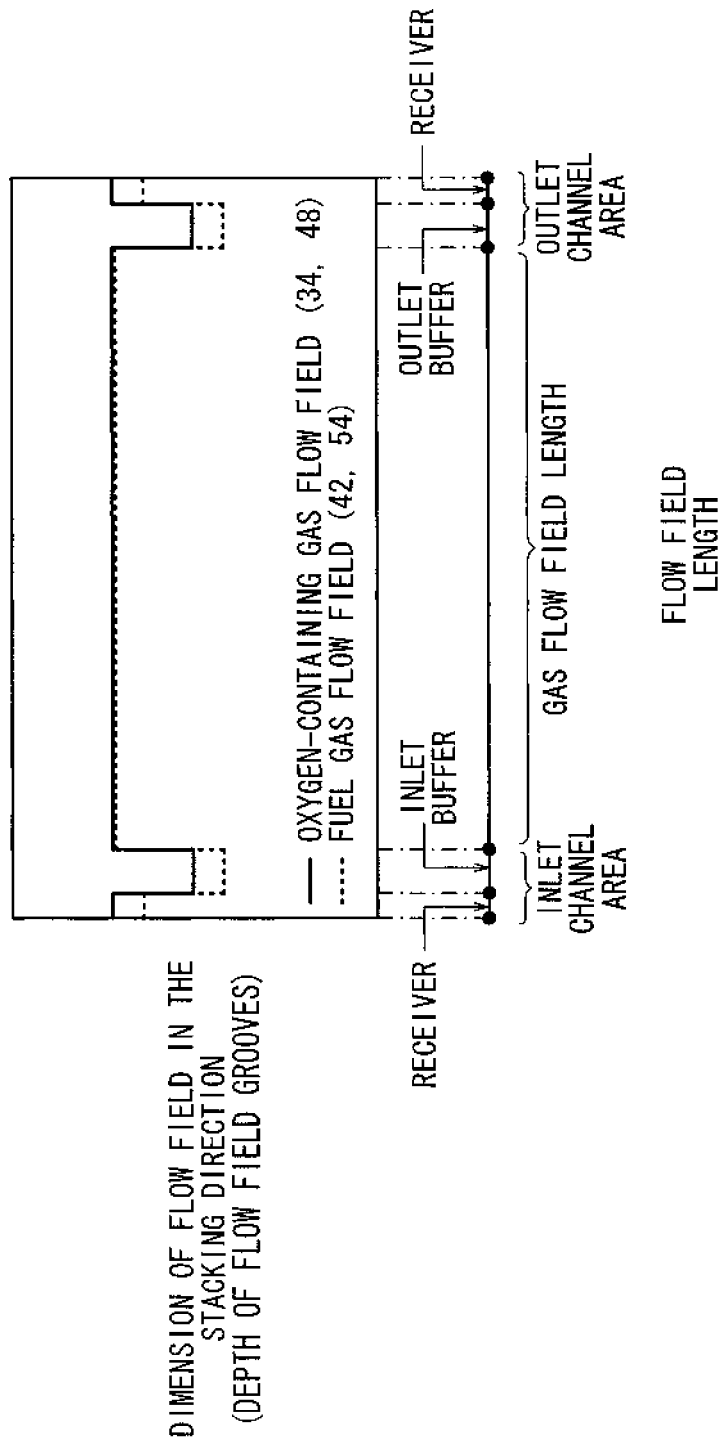
FIG. 5 is a view showing the depth of flow field grooves relative to the flow field length.

As shown in FIG. 5, the first oxygen-containing gas flow field 34 and the second oxygen-containing gas flow field 48 have the same length, and the flow grooves of the first oxygen-containing gas flow field 34 and the second oxygen-containing gas flow field 48 have the same depth. The first oxygen-containing gas flow field 34 includes an inlet channel area including the receivers 38a and the inlet buffer 36a, and an outlet channel area including the receivers 38b and the outlet buffer 36b. The second oxygen-containing gas flow field 48 includes an inlet channel area including the receivers 52b and the inlet buffer 50a, and an outlet channel area including the receivers 52b and the outlet buffer 50b. The inlet channel areas and the outlet channel areas of the first oxygen-containing gas flow field 34 and the second oxygen-containing gas flow field 48 have the same depth.

Likewise, the first fuel gas flow field 42 and the second fuel gas flow field 54 have the same length, and the flow grooves of the first fuel gas flow field 42 and the second fuel gas flow field 54 have the same depth. The inlet channel areas and the outlet channel areas of the first fuel gas flow field 42 and the second fuel gas flow field 54 have the same depth.

It should be noted that the above structure may be adopted only in the first oxygen-containing gas flow field 34 and the second oxygen-containing gas flow field 48, or the above structure may be adopted only in the first fuel gas flow field 42 and the second fuel gas flow field 54.

Operation of the fuel cell 10 will be described.

Firstly, as shown in FIG. 1, in each power generation unit 12 of the fuel cell 10, an oxygen-containing gas is supplied to the oxygen-containing gas supply passage 22a, a fuel gas such as a hydrogen containing gas is supplied to the fuel gas supply passage 24a, and a coolant such as pure water or ethylene glycol is supplied to the coolant supply passage 26a.

The oxygen-containing gas flows from the oxygen-containing gas supply passage 22a into the first oxygen-containing gas flow field 34 of the first metal separator 14 and the second oxygen-containing gas flow field 48 of the second metal separator 18. Thus, the oxygen-containing gas flows downwardly along the respective cathodes 30 of the first and second membrane electrode assemblies 16a, 16b.

The fuel gas flows from the fuel gas supply passage 24a into the first fuel gas flow field 42 of the second metal separator 18 and the second fuel gas flow field 54 of the third metal separator 20. Thus, the fuel gas flows downwardly along the respective anodes 32 of the first and second membrane electrode assemblies 16a, 16b.

As described above, in each of the first and second membrane electrode assemblies 16a, 16b, the oxygen-containing gas supplied to the cathode 30 and the fuel gas supplied to the anode 32 are consumed in the electrochemical reactions at electrode catalyst layers 30b, 32b of the cathode 30 and the anode 32 for generating electricity.

Then, the oxygen-containing gas consumed at the cathode 30 is discharged into the oxygen-containing gas discharge passage 22b. Likewise, the fuel gas consumed at the anode 32 is discharged into the fuel gas discharge passage 24b.

As shown in FIGS. 1 and 2, the coolant flows into the first and second coolant flow fields 40a, 40b formed between the adjacent power generation units 12. The coolant flows in the horizontal direction indicated by the arrow B (as shown in FIG. 1), and cools the second membrane electrode assembly 16b of one of the adjacent power generation units 12, and the first membrane electrode assembly 16a of the other of the adjacent power generation units 12. That is, the coolant does not cool the space between the first and second membrane electrode assemblies 16a, 16b inside the power generation unit 12, for performing so-called skip cooling. Thereafter, the coolant is discharged from the coolant discharge passage 26b.

In the first embodiment, as shown in FIG. 2, the number of the corrugated flow grooves 34a of the first oxygen-containing gas flow field 34 is different from the number of the corrugated flow grooves 48a of the second oxygen-containing gas flow field 48. Specifically, the number of the corrugated flow grooves 34a is seven, and the number of the corrugated flow grooves 48a is six. The first oxygen-containing gas flow field 34 and the second oxygen-containing gas flow field 48 have the same length, and the flow grooves of the first oxygen-containing gas flow field 34 and the second oxygen-containing gas flow field 48 have the same depth (see FIG. 5).

Figure 6:
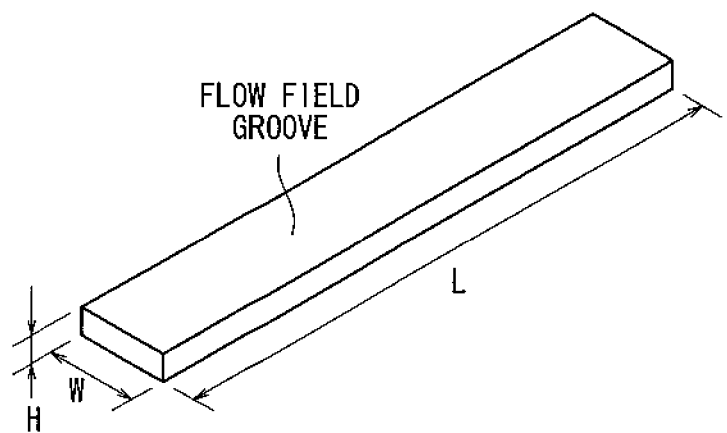
FIG. 6 is a view showing a flow field groove used in a theoretical expression for calculating a pressure loss.

Assuming that the flow groove has a rectangular cross section with the width W, the depth (height) H, and the length L as shown in FIG. 6, based on the theoretical formula for the pressure loss, the volume flow rate Q of the fluid can be obtained by the following expression.

$$Q = \pi \times \Delta P \times D^4 / (128 \times \mu \times L) \text{ (when the flow has a laminar flow, Re (Reynolds number)} < 2100)$$

where $D = (128 \times w \times H^3/(\pi \times K))^{(1/4)}$, $K=12$

From the above expression, the following expressions can be obtained.

$$\Delta P = 12 \times \mu \times L \times Q / w \times H^3$$

$$\Delta P = 12 \times \mu \times L \times Q / S \times H^2$$

$$\Delta P = 12 \times \mu \times L \times v / H^2$$

(where $\mu$ denotes the fluid viscosity, S denotes the surface area, and v denotes the fluid velocity)

Figure 7:
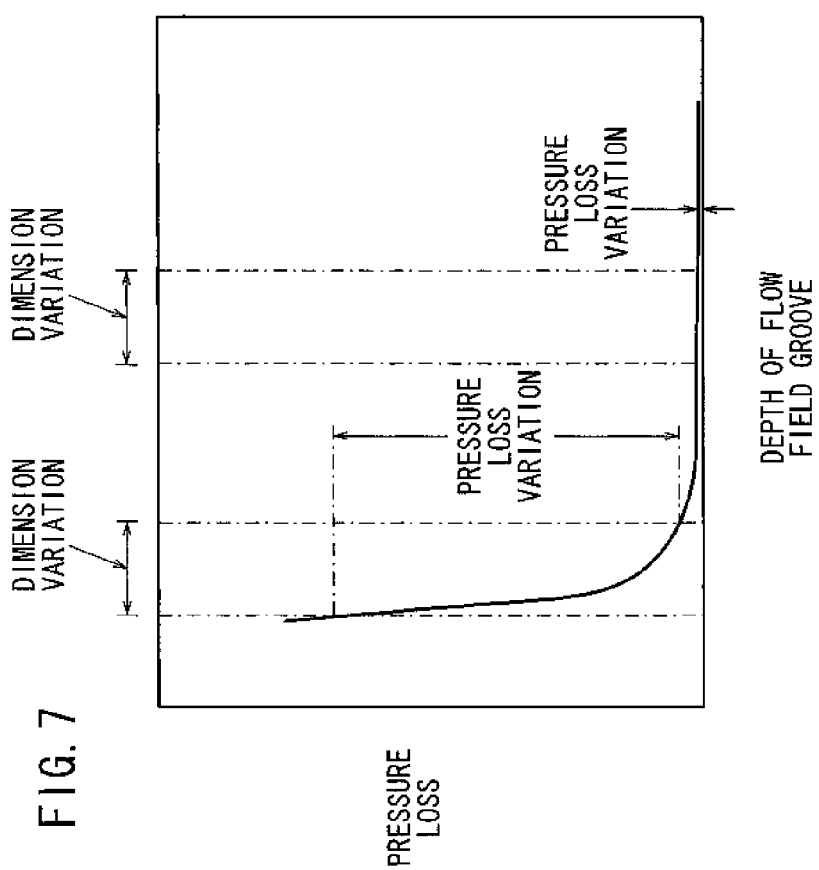
FIG. 7 is a graph showing the relationship between the depth of the flow field groove and variation of the pressure loss.

Therefore, the pressure loss in the flow groove is inversely proportional to the square of the depth H, and proportional to the fluid velocity v. Therefore, as shown in FIG. 7, by designing the flow groove to have a large depth to some extent, for example, the influence due to variation in the number of the flow grooves or the width of the flow field (W) can be eliminated. Stated otherwise, even if the width of the flow groove is changed, or the number of flow grooves is changed, by designing the flow grooves to have the same length and depth, the pressure loss does not change significantly.

In the structure, even if the number of flow grooves in the first oxygen-containing gas flow field 34 is different from the number of flow grooves in the second oxygen-containing gas flow field 48, variation in the pressure loss is suppressed effectively. With the simple structure, it is possible to maintain the same power generation characteristics advantageously.

Likewise, the number of corrugated flow grooves 42a of the first fuel gas flow field 42 is different from the number of corrugated flow grooves 54a of the second fuel gas flow field 54. The first fuel gas flow field 42 and the second fuel gas flow field 54 have the same length, and the flow grooves of the first fuel gas flow field 42 and the second fuel gas flow field 54 have the same depth (see FIG. 5). Thus, variation in the pressure loss is suppressed effectively. With the simple structure, it is possible to maintain the power generation characteristics advantageously.

Further, the inlet channel areas and the outlet channel areas of the first oxygen-containing gas flow field 34 and the second oxygen-containing gas flow field 48 have the same depth. The inlet channel areas and the outlet channel areas of the first fuel gas flow field 42 and the second fuel gas flow field 54 have the same depth. In the structure, variation of the pressure loss in the inlet channel area and the outlet channel area is suppressed effectively, and improvement in the power generation performance is achieved easily.

Figure 8:
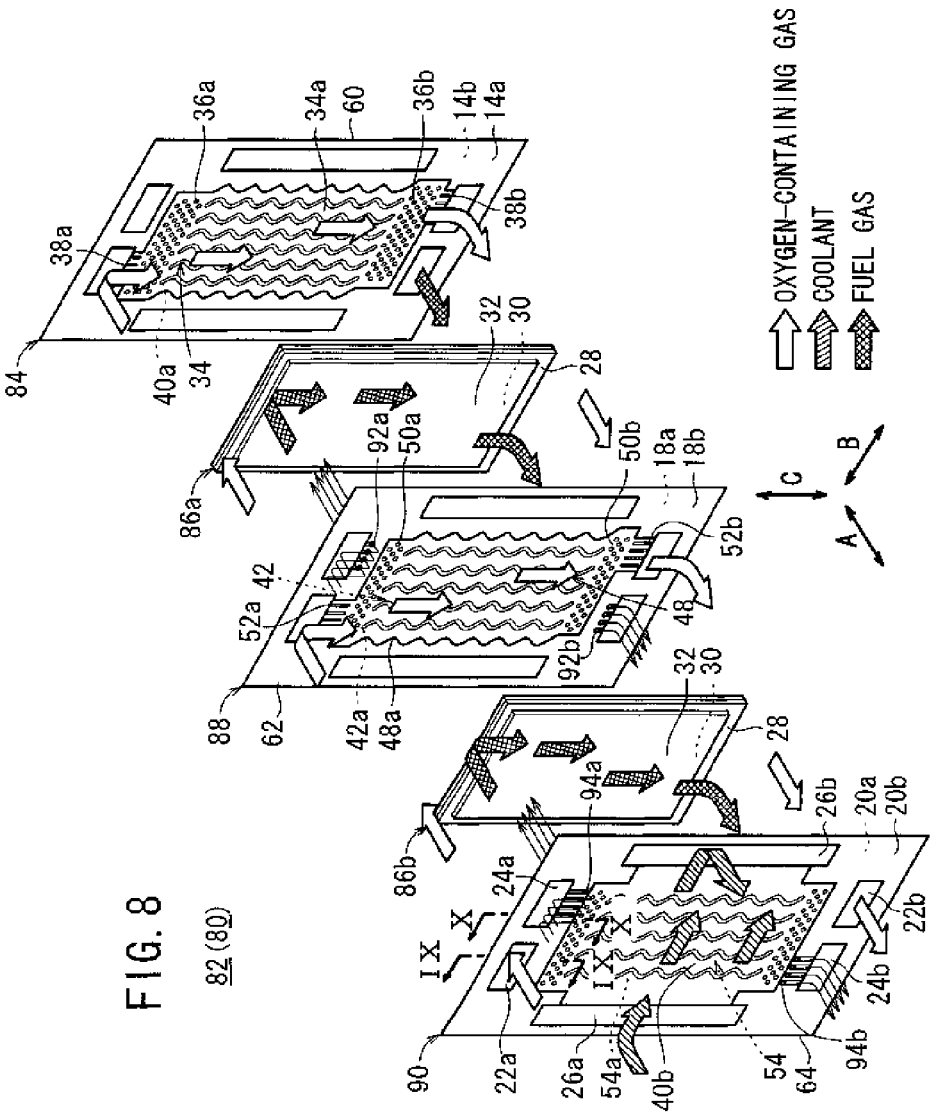
FIG. 8 is an exploded perspective view showing a fuel cell according to a second embodiment of the present invention.
Figure 9:
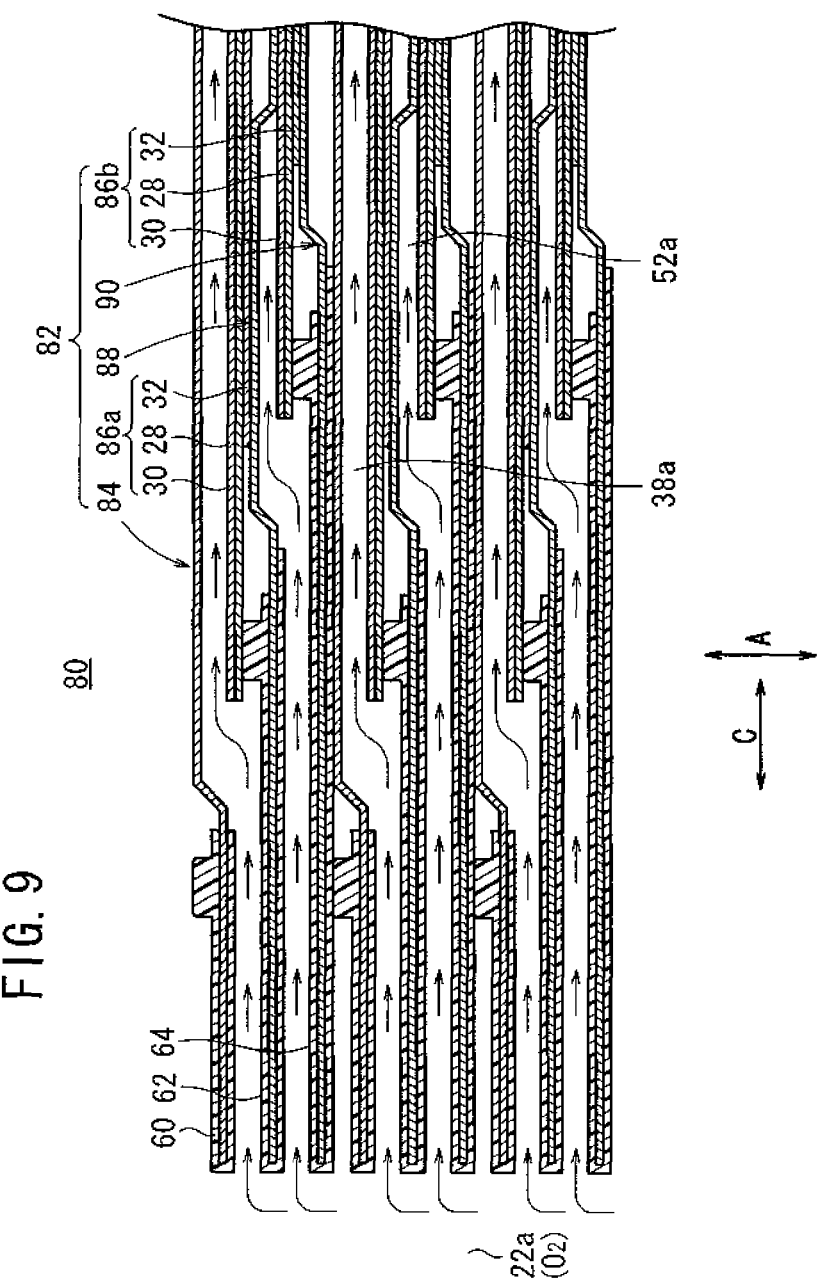
FIG. 9 is a cross sectional view showing the fuel cell, taken along a line IX-IX in FIG. 8.
Figure 10:
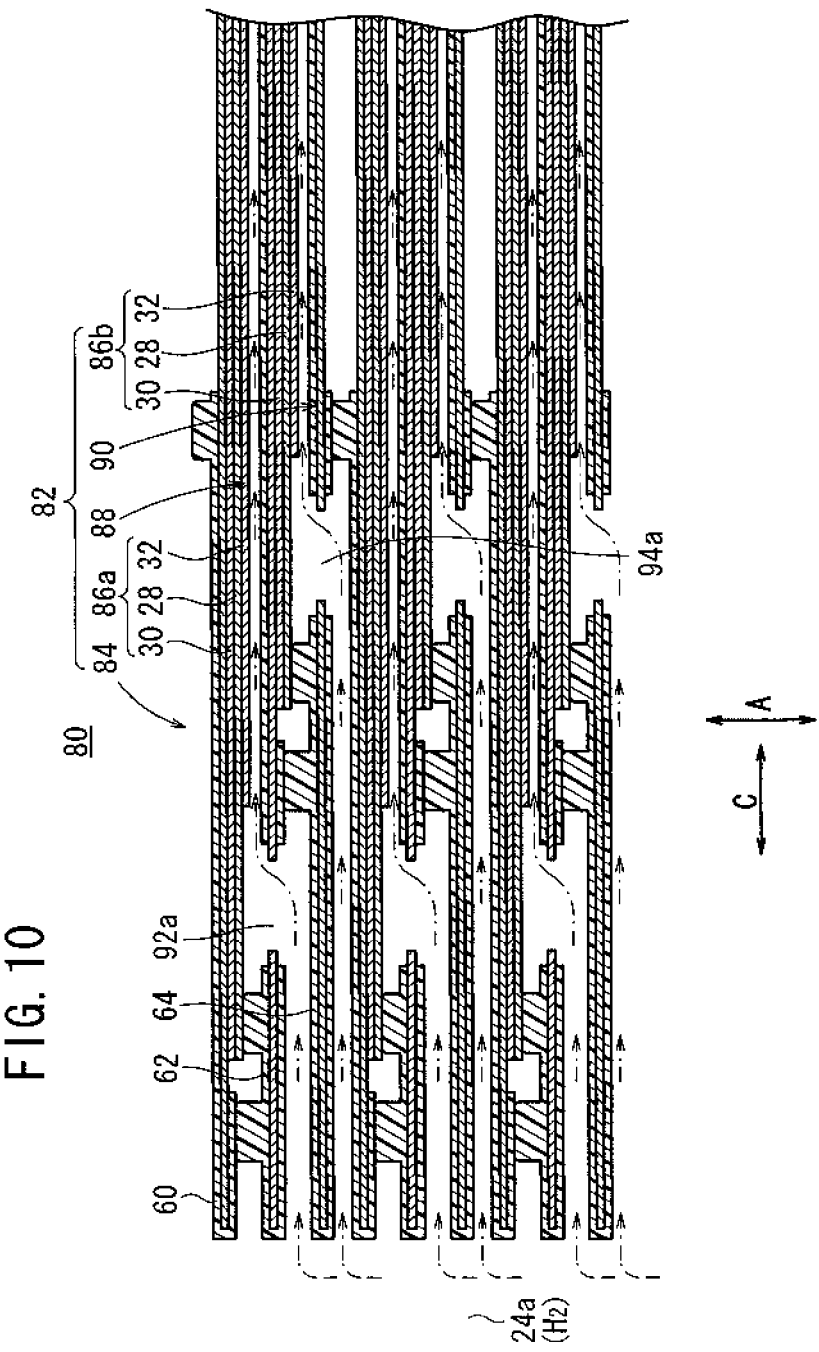
FIG. 10 is a cross sectional view showing the fuel cell taken along a line X-X in FIG. 8.

FIG. 8 is an exploded perspective view showing a fuel cell 80 according to a second embodiment of the present invention. FIG. 9 is a cross sectional view showing the fuel cell 80 taken along a line IX-IX in FIG. 8. FIG. 10 is a cross sectional view showing the fuel cell 80 taken along a line X-X in FIG. 8. The constituent elements that are identical to those of the fuel cell 10 according to the first embodiment are labeled with the same reference numerals, and detailed description will be omitted.

The fuel cell 80 includes a plurality of power generation units 82. The power generation unit 82 includes a first metal separator 84, a first membrane electrode assembly (MEA) 86a stacked on the first metal separator 84, a second metal separator 88 stacked on the first membrane electrode assembly 86a, a second membrane electrode assembly (MEA) 86b stacked on the second metal separator 88, and a third metal separator 90 stacked on the second membrane electrode assembly (MEA) 86b.

The first membrane electrode assembly 86a and the second membrane electrode assembly 86b do not have passages for the oxygen-containing gas, the fuel gas, and the coolant. The surface area of the anode 32 is smaller than the surface area of the cathode 30. The outer dimensions of the first membrane electrode assembly 86a are larger than the outer dimensions of the second membrane electrode assembly 86b.

A plurality of through holes 92a, 92b are formed in the second metal separator 88 as passages for the fuel gas, at positions near the fuel gas supply passage 24a and the fuel gas discharge passage 24b. The through holes 92a, 92b are connected to the fuel gas supply passage 24a and the fuel gas discharge passage 24b on the surface 18b facing the second membrane electrode assembly 86b. The through holes 92a, 92b pass through the second metal separator 88, and are connected to the first fuel gas flow field 42 on the surface 18a facing the first membrane electrode assembly 86a.

A plurality of through holes 94a, 94b are formed in the third metal separator 90, at positions offset from the through holes 92a, 92b toward the center of the third metal separator 90. The through holes 94a, 94b are connected to the fuel gas supply passage 24a and the fuel gas discharge passage 24b on the surface 20b. The through holes 94a, 94b pass through the third metal separator 90, and are connected to the second fuel gas flow field 54 on the surface 20a.

The receivers 52a, 52b provided in the second metal separator 88 are longer than the receivers 38a, 38b in the first metal separator 84. The dimensions of the inlet buffer 50a and the outlet buffer 50b of the second metal separator 88 in the direction indicated by the arrow C are smaller than those of the inlet buffer 36a and the outlet buffer 36b of the first metal separator 84. That is, the number of the flow grooves in the first oxygen-containing gas flow field 34 is different from the number of the flow grooves in the second oxygen-containing gas flow field 48. The first oxygen-containing gas flow field 34 and the second oxygen-containing gas field 48 have the same length, and the flow grooves of the first oxygen-containing gas flow field 34 and the second oxygen-containing gas field 48 have the same depth.

Likewise, the number of flow grooves in the first fuel gas flow field 42 is different from the number of flow grooves in the second fuel gas flow field 54. The first fuel gas flow field 42 and the second fuel gas flow field 54 have the same length. The flow grooves of the first fuel gas flow field 42 and the second fuel gas flow field 54 have the same depth.

In the second embodiment, the first oxygen-containing gas flow field 34 and the second oxygen-containing gas flow field 48 have the same length, and the flow grooves of the first oxygen-containing gas flow field 34 and the second oxygen-containing gas flow field 48 have the same depth. In the structure, even if the number of the flow grooves in the first oxygen-containing gas flow field 34 is different from the number of the flow grooves in the second oxygen-containing gas flow field 48, variation in the pressure loss is effectively suppressed. Thus, the same advantages as in the case of the first embodiment can be obtained. For example, with the simple structure, it is possible to maintain the power generation characteristics advantageously.

While the invention has been particularly shown and described with reference to the preferred embodiments, it will be understood that variations and modifications can be effected thereto by those skilled in the art without departing from the spirit and scope of the invention as defined by the appended claims.

What is claimed is:

1. A fuel cell stack formed by stacking a plurality of power generation units, the power generation units each comprising at least first and second electrolyte electrode assemblies, and formed by stacking the first electrolyte electrode assembly on a first metal separator, a second metal separator on the first electrolyte electrode assembly, the second electrolyte electrode assembly on the second metal separator, and a third metal separator on the second electrolyte electrode assembly, the first and second electrolyte electrode assemblies each comprising a pair of electrodes, and an electrolyte interposed between the electrodes, first to fourth reactant gas flow fields for allowing predetermined reactant gases to flow along power generation surfaces being formed between the first metal separator and the first electrolyte electrode assembly, between the first electrolyte electrode assembly and the second metal separator, between the second metal separator and the second electrolyte electrode assembly, and between the second electrolyte electrode assembly and the third metal separator, a coolant flow field for allowing a coolant to flow being formed in each space between the power generation units, wherein:

a same reactant gas flows through the first and third reactant gas flow fields, ridges and flow grooves are formed in the first reactant gas flow field and in the third reactant gas flow field for distributing the same reactant gas to the power generation surfaces, the ridges and flow grooves being formed by corrugating the first metal separator and the second metal separator, wherein the ridges of the first and third reactant gas flow fields extend in a first direction and exist between the flow grooves of the first and third reactant gas flow fields, and the flow grooves of the first and third reactant gas flow fields extend in a second direction opposed to the first direction, a number of flow grooves in the first reactant gas flow field is different from a number of flow grooves in the third reactant gas flow field, wherein when the fuel cell is assembled, a groove of the first reactant gas flow field substantially aligns with a ridge of the third reactant gas flow field, the first reactant gas flow field and the third reactant gas flow field have a same length, and the flow grooves in the first reactant gas flow field and the flow grooves in the third reactant gas flow field have a same depth.

2. A fuel cell according to claim 1, wherein a reactant gas passage for one of the reactant gases extends through the power generation units;

at least inlet channel areas or outlet channel areas connecting the reactant gas passage and the first reactant gas flow field and connecting the reactant gas passage and the third reactant gas flow field have the same depth.

3. A fuel cell according to claim 2, wherein the inlet or outlet channel areas include buffers having a plurality of bosses.

4. A fuel cell according to claim 1, wherein each of the first to fourth reactant gas flow fields includes a plurality of corrugated flow grooves extending only in one direction perpendicular to the stacking direction.

* * * * *